(12) United States Patent
Lu

(10) Patent No.: US 8,145,181 B2
(45) Date of Patent: Mar. 27, 2012

(54) ELECTRIC POWER TRANSMISSION SYSTEM FOR COMMUNICATIONS WITH NOISE ELIMINATION ARRANGEMENT

(76) Inventor: Ming-Wei Lu, Taipei (TW)

( * ) Notice: Subject to any disclaimer, the term of this patent is extended or adjusted under 35 U.S.C. 154(b) by 750 days.

(21) Appl. No.: 12/254,840

(22) Filed: Oct. 21, 2008

(65) Prior Publication Data

US 2010/0098175 A1    Apr. 22, 2010

(51) Int. Cl.
*H04B 3/54*    (2006.01)
(52) U.S. Cl. ........ 455/402; 455/425; 455/129; 455/118; 455/63; 375/247; 375/238; 375/354; 375/218; 375/219; 307/2
(58) Field of Classification Search .................. 375/258, 375/238, 354, 218, 219, 247, 257; 455/63, 455/82–83, 402, 425, 118, 129; 307/2
See application file for complete search history.

(56) References Cited

U.S. PATENT DOCUMENTS

| | | | |
|---|---|---|---|
| 7,142,832 B2 * | 11/2006 | Inoue et al. | 455/129 |
| 7,649,935 B2 * | 1/2010 | Song et al. | 375/238 |
| 2008/0181316 A1 * | 7/2008 | Crawley et al. | 375/258 |

* cited by examiner

*Primary Examiner* — Charles Appiah
*Assistant Examiner* — Michael Vu

(57) ABSTRACT

An electric power transmission system for communications includes on/off switches; high-voltage power assemblies; groups of high-voltage devices each being powered by the high-voltage power assembly; a carrier waves communications network comprising a transformer and filter, a filter, and a carrier waves coupling device interconnecting the transformer and filter and the filter, wherein the transformer and filter includes a low-voltage power assembly for communications and the filter includes a high-voltage power assembly for communications; and low and high-voltage devices. Data can be communicated between the low-voltage devices, between the high-voltage devices, or between the low-voltage device and the high-voltage device by transmitting carrier waves over the AC power.

1 Claim, 4 Drawing Sheets

US 8,145,181 B2

ELECTRIC POWER TRANSMISSION SYSTEM FOR COMMUNICATIONS WITH NOISE ELIMINATION ARRANGEMENT

BACKGROUND OF THE INVENTION

1. Field of Invention

The invention relates to data communications and more particularly to an electric power transmission system for data communications having a noise elimination arrangement.

2. Description of Related Art

Conventionally, electric power is transmitted in high-voltage from a power station through a transmission grid. It is also known that network equipment, electronic device for communications or the like typically operates in low-voltage. However, noise, interference, or both may be generated in these devices if no appropriate noise elimination means is provided in the transmission grid. Thus, a need for improvement exists.

SUMMARY OF THE INVENTION

It is therefore one object of the invention to provide an electric power transmission system for communications with a noise elimination arrangement.

The above and other objects, features and advantages of the invention will become apparent from the following detailed description taken with the accompanying drawings.

DETAILED DESCRIPTION OF THE INVENTION

Figure 1:
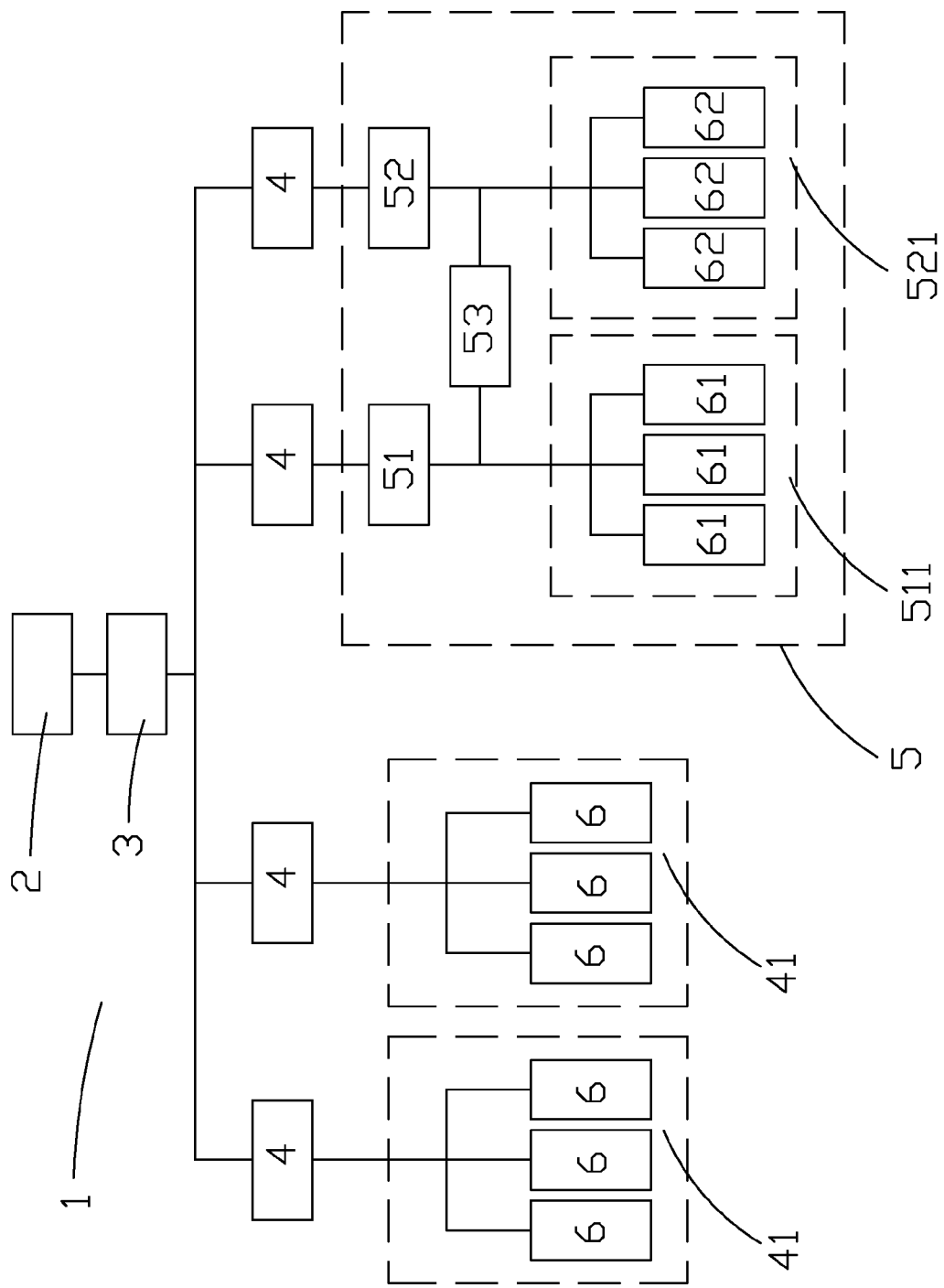
FIG. 1 is a block diagram of the invention.

Referring to FIGS. 1 to 4, an electric power transmission system for communications 1 of the invention is illustrated in detailed below.

The electric power transmission system for communications 1 comprises a main switch 3 for turning on or off high-voltage power transmitted from a transmission grid 2, and a plurality of (four are shown) on/off switches 4.

A first high-voltage power assembly (e.g., 110V or 220V voltage) 41 is electrically connected to a first on/off switch 4 and a second high-voltage power assembly 41 is electrically connected to a second on/off switch 4 respectively. Each of the first and second high-voltage power assemblies 41 is adapted to supply high-voltage power to a plurality of (three are shown) high-voltage devices 6.

A carrier waves communications network 5 is electrically connected to the remaining third and fourth on/off switches 4. The carrier waves communications network 5 comprises a transformer and filter 51 electrically connected to the third on/off switch 4, a filter 52 electrically connected to the fourth on/off switch 4, and a carrier waves coupling device 53 electrically interconnecting the transformer and filter 51 and the filter 52.

A low-voltage power assembly for communications 511 is electrically connected to the transformer and filter 51 and a high-voltage power assembly for communications 521 is electrically connected to the filter 52 respectively. The low-voltage power assembly for communications 511 is adapted to supply power to a plurality of (three are shown) low-voltage devices 61 and the high-voltage power assembly for communications 521 is adapted to supply power to a plurality of (three are shown) high-voltage devices 62 respectively.

Figure 2:
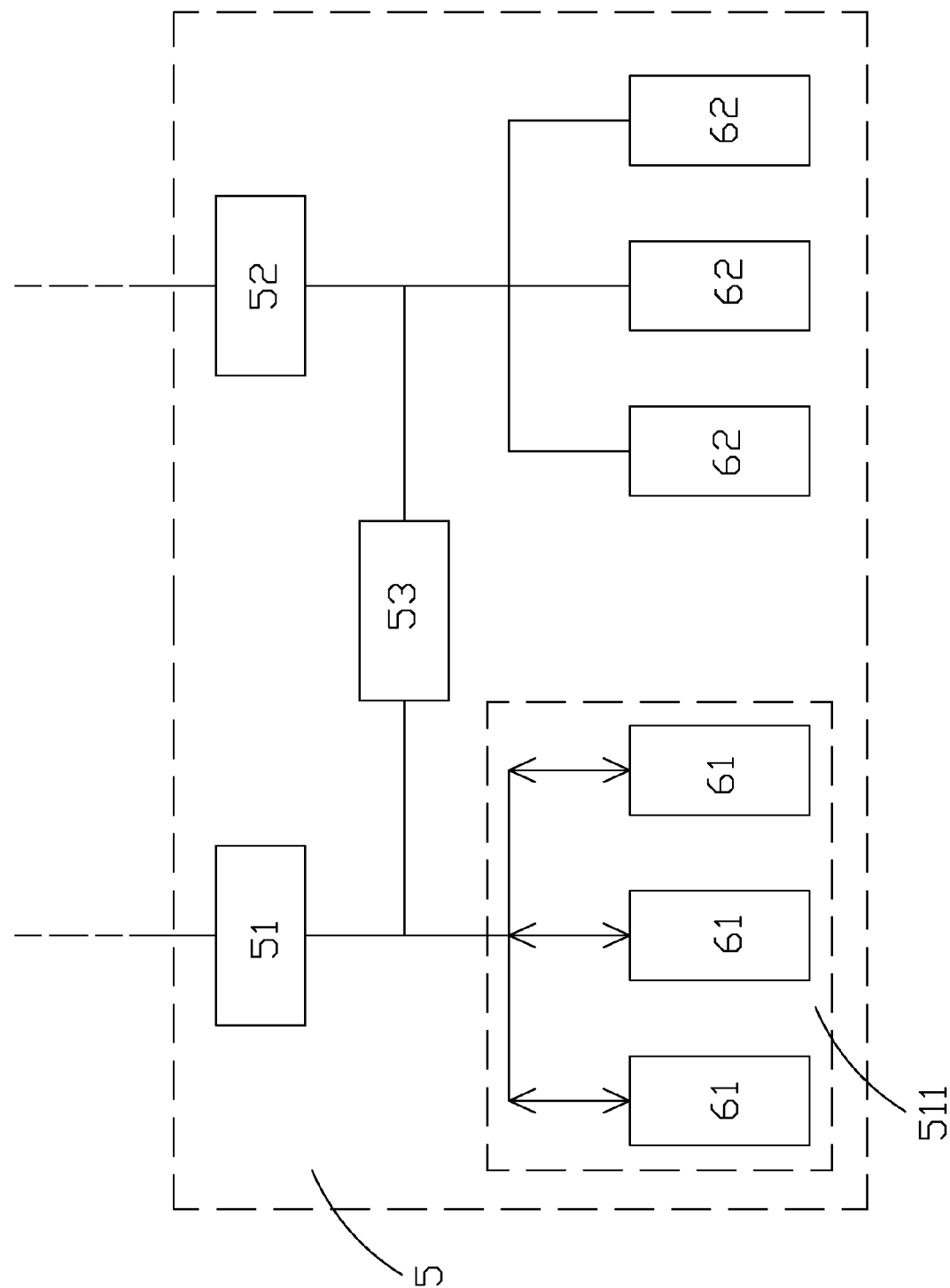
FIG. 2 is a block diagram of the carrier waves communications network of FIG. 1 where low-voltage power assembly for communications is illustrated.

Referring to FIG. 2 specifically, the low-voltage power assembly for communications 511 is adapted to reduce voltage (e.g., 110V AC or 220V AC transmitted from the transmission grid 2) to a predetermined low voltage. Moreover, the low-voltage power assembly for communications 511 is adapted to filter out noise in the low-voltage AC power. As a result, a noise and interference (e.g., electromagnetic (EM) interference) free low-voltage AC power is supplied to each of the low-voltage devices 61 for use.

Data communications among the low-voltage devices 61 is effected by transmitting carrier waves therebetween over the low-voltage AC power. Hence, no additional network for communications among the low-voltage devices 61 is required to construct. This is an intelligent type of automatic control.

Figure 3:
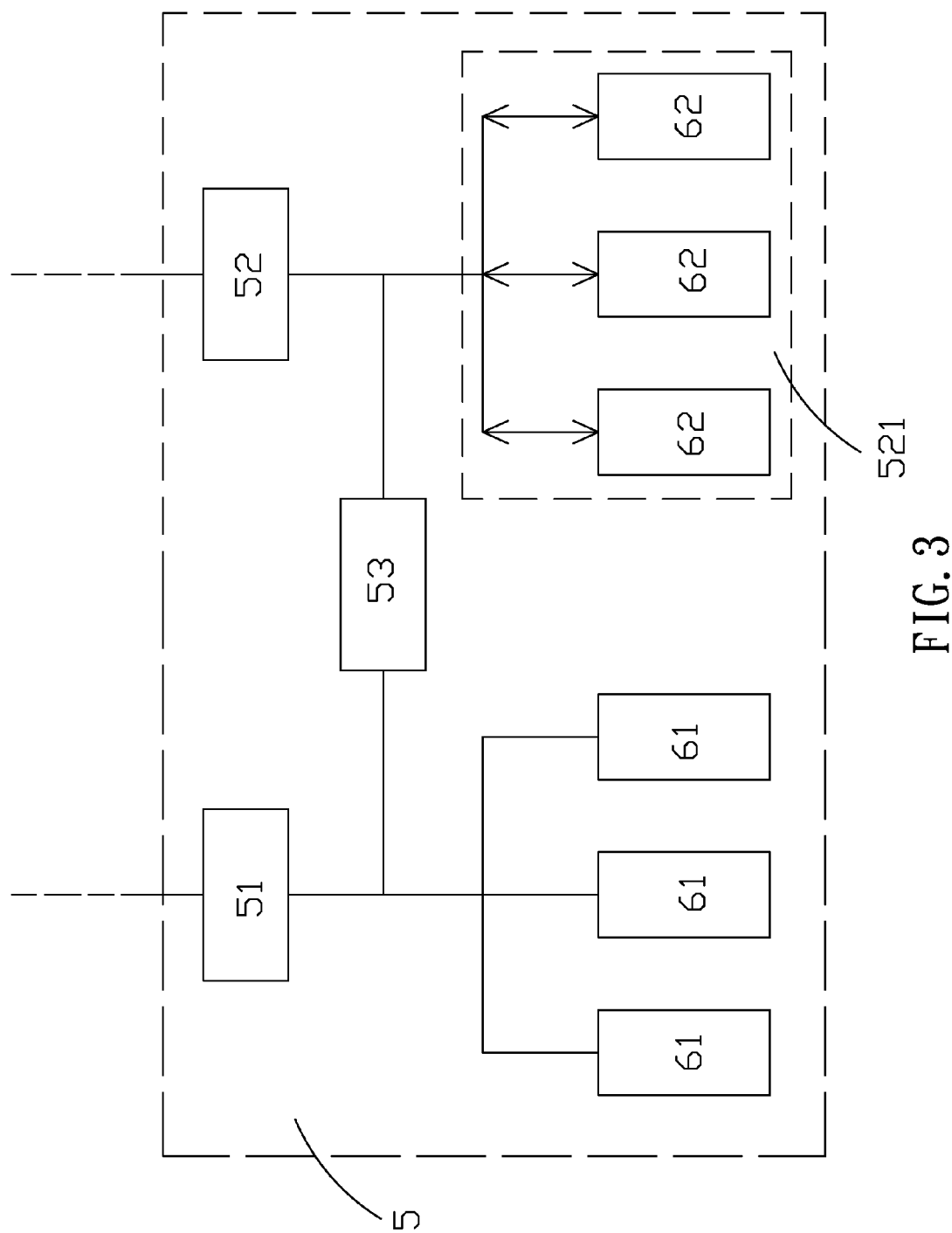
FIG. 3 is a block diagram of the carrier waves communications network of FIG. 1 where high-voltage power assembly for communications is illustrated.

Referring to FIG. 3 specifically, the high-voltage power assembly for communications 521 is adapted to filter out noise in the high-voltage AC power (e.g., 110V AC or 220V AC transmitted from the transmission grid 2). As a result, a noise and interference (e.g., electromagnetic (EM) interference) free high-voltage AC power is supplied to each of the high-voltage devices 62 for use.

Data communications among the high-voltage devices 62 is effected by transmitting carrier waves therebetween over the high-voltage AC power. Hence, no additional network for communications among the low-voltage devices 61 is required to construct. This is also an intelligent type of automatic control.

Figure 4:
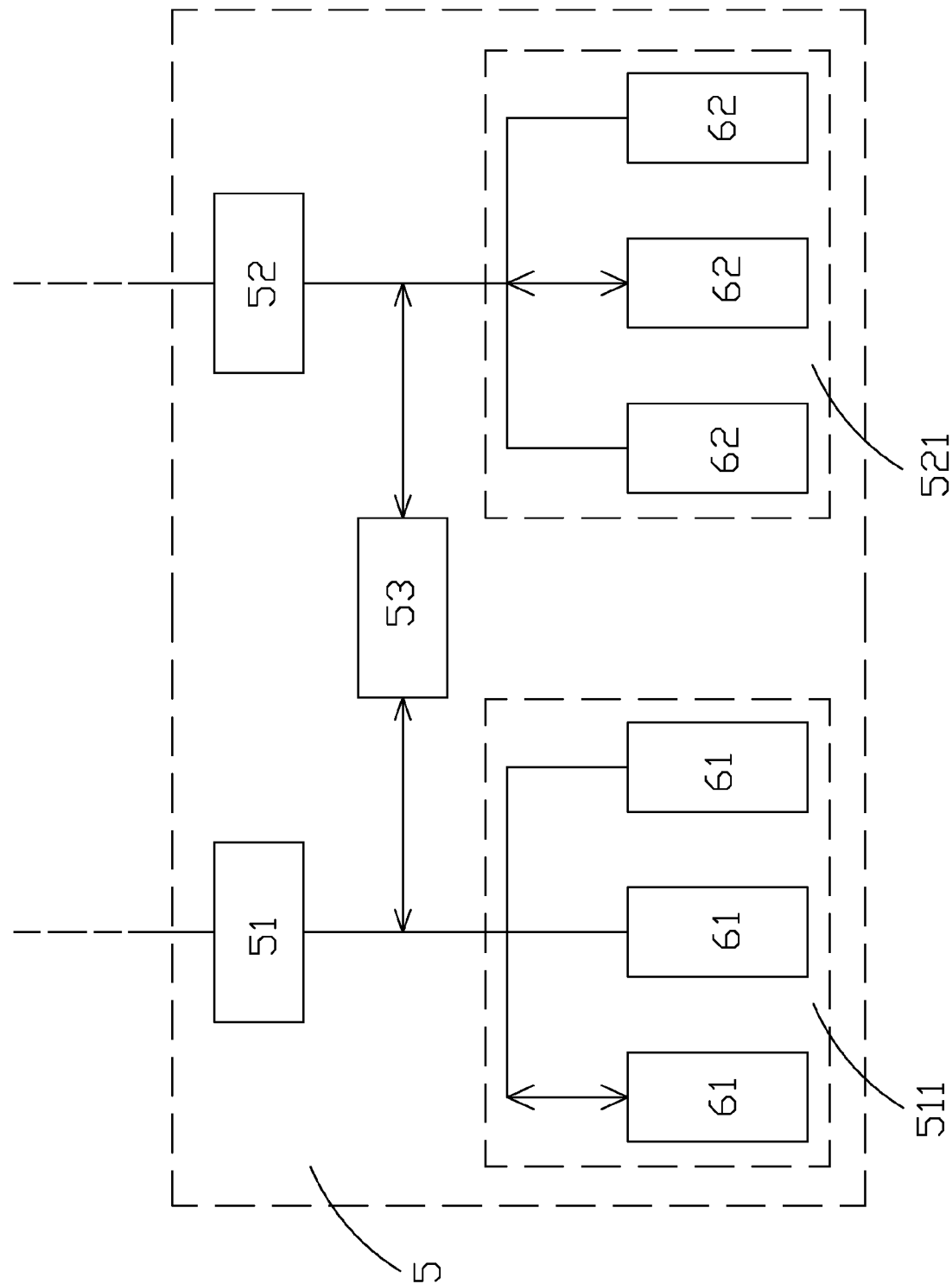
FIG. 4 is a block diagram of the carrier waves communications network for sending data between high-voltage power assembly for communications and low-voltage power assembly for communications according to the invention.

Referring to FIG. 4 specifically, for example data can be sent from the low-voltage device 61 to the high-voltage device 62 by transmitting carrier waves from the low-voltage power assembly for communications 511 to the high-voltage power assembly for communications 521 via the carrier waves coupling device 53. Alternatively, data can be sent from the high-voltage device 62 to the low-voltage device 61 by transmitting carrier waves from the high-voltage power assembly for communications 521 to the low-voltage power assembly for communications 511 via the carrier waves coupling device 53.

While the invention herein disclosed has been described by means of specific embodiments, numerous modifications and variations could be made thereto by those skilled in the art without departing from the scope and spirit of the invention set forth in the claims.

What is claimed is:

1. An electric power transmission system for communications, comprising:
   a main switch for turning on or off high-voltage AC (alternating current) power transmitted from a transmission grid;
   a plurality of on/off switches;
   a plurality of high-voltage power assemblies each electrically connected to one of the on/off switches;
   a plurality of groups of high-voltage devices, each group of high-voltage devices being powered by one of the high-voltage power assemblies;
   a carrier waves communications network electrically connected to the remaining ones of the on/off switches, the carrier waves communications network comprising a transformer and filter electrically connected to one of the on/off switches, a filter electrically connected to one of the on/off switches, and a carrier waves coupling device electrically interconnecting the transformer and filter and the filter wherein the transformer and filter comprises a low-voltage power assembly for communications and the filter comprises a high-voltage power assembly for communications;

a plurality of low-voltage devices being powered by the low-voltage power assembly for communications; and a plurality of high-voltage devices being powered by the high-voltage power assembly for communications, wherein the low-voltage power assembly for communications is adapted to reduce voltage of the high-voltage AC power transmitted from the transmission grid to a predetermined low voltage;

wherein the low-voltage power assembly for communications is adapted to filter out noise in the AC having the predetermined low voltage;

wherein data communications among the low-voltage devices is effected by transmitting carrier waves therebetween over the AC having the predetermined low voltage;

wherein the high-voltage power assembly for communications is adapted to filter out noise in the high-voltage AC power;

wherein data communications among the high-voltage devices is effected by transmitting carrier waves therebetween over the high-voltage AC power; and wherein data is adapted to send either from the low-voltage device to the high-voltage device by transmitting carrier waves from the low-voltage power assembly for communications to the high-voltage power assembly for communications via the carrier waves coupling device or from the high-voltage device to the low-voltage device by transmitting carrier waves from the high-voltage power assembly for communications to the low-voltage power assembly for communications via the carrier waves coupling device.

* * * * *